United States Patent
Varga et al.

(10) Patent No.: US 12,095,657 B2
(45) Date of Patent: Sep. 17, 2024

(54) PACKET OR FRAME REPLICATION AND ELIMINATION WITH EXPLICT OR IMPLICT NOTIFICATION TO RESET SEQUENCE NUMBER RECOVERY

(71) Applicant: Telefonaktiebolaget LM Ericsson (publ), Stockholm (SE)

(72) Inventors: Balázs Varga, Budapest (HU); János Farkas, Kecskemét (HU); András Kern, Budapest (HU); István Moldován, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 205 days.

(21) Appl. No.: 17/623,327

(22) PCT Filed: Jul. 5, 2019

(86) PCT No.: PCT/IB2019/055763
§ 371 (c)(1),
(2) Date: Dec. 28, 2021

(87) PCT Pub. No.: WO2021/005397
PCT Pub. Date: Jan. 14, 2021

(65) Prior Publication Data
US 2022/0368626 A1    Nov. 17, 2022

(51) Int. Cl.
*H04L 45/28*    (2022.01)
*H04L 45/24*    (2022.01)
*H04L 47/34*    (2022.01)

(52) U.S. Cl.
CPC .............. *H04L 45/28* (2013.01); *H04L 45/24* (2013.01); *H04L 47/34* (2013.01)

(58) Field of Classification Search
CPC ......... H04L 45/28; H04L 45/24; H04L 47/34; H04L 47/27
See application file for complete search history.

(56) References Cited

U.S. PATENT DOCUMENTS

| | | |
|---|---|---|
| 5,086,428 A | 2/1992 | Perlman et al. |
| 7,571,343 B1 * | 8/2009 | Xiang ................. H04L 63/0272 714/2 |

(Continued)

FOREIGN PATENT DOCUMENTS

| | | | |
|---|---|---|---|
| CN | 106911436 A | * | 6/2017 |
| JP | 2004228754 A | | 8/2004 |

(Continued)

OTHER PUBLICATIONS

Anand, et al., "Formal Modeling and Analysis of the AFDX Frame Management Design," IEEE International Symposium on Object and Component-Oriented Real-Time Distributed Computing, Gyeongju, Korea, Apr. 24-26, 2006, pp. 393-399.

(Continued)

*Primary Examiner* — Abdulkader M Alriyashi
(74) *Attorney, Agent, or Firm* — Withrow & Terranova, PLLC

(57) ABSTRACT

Systems and methods for packet or frame replication and elimination in a Time Sensitive Networking (TSN) network or Deterministic Networking (DetNet) network are disclosed. In some embodiments, a method of operation of a node in a TSN network or DetNet network comprises determining whether to reset a sequence recovery function used for frame or packet elimination for a particular stream of packets based on either or both of an explicit indication or an implicit indication and resetting the sequence recovery function used for frame or packet elimination for the particular stream of packets upon determining to reset the sequence recovery function. In this manner, packet or frame elimination is improved by avoiding scenarios that result in discarding valid packets or frames due to an out of sync condition between the sequence generation function at the (Continued)

replicator and the sequence recovery function at the eliminator.

18 Claims, 10 Drawing Sheets

(56) References Cited

U.S. PATENT DOCUMENTS

| | | | |
|---|---|---|---|
| 2015/0295635 A1* | 10/2015 | Koskiahde | H04L 12/2863 370/315 |
| 2019/0044752 A1 | 2/2019 | Sudrat et al. | |

FOREIGN PATENT DOCUMENTS

| | | |
|---|---|---|
| JP | 2009147579 A | 7/2009 |
| JP | 2009147597 A | 7/2009 |
| WO | 2016185794 A1 | 11/2016 |

OTHER PUBLICATIONS

Author Unknown, "Information technology—Telecommunications and information exchange between systems—Local and metropolitan area networks—Specific requirements—Part 1CB: Frame replication and elimination for reliability," International Standard, First Edition, ISO/IEC/IEEE 8802-1CB, Feb. 2019, 104 pages.

Author Unknown, "IEEE Standard for Local and metropolitan area networks—Frame Replication and Elimination for Reliability," IEEE Std 802.1CB, 2017, IEEE Computer Society, 102 pages.

International Search Report and Written Opinion for International Patent Application No. PCT/IB2019/055763, mailed Mar. 3, 2020, 19 pages.

Author Unknown, "Draft Standard for Local and metropolitan area networks—Frame Replication and Elimination for Reliability," IEEE Standard P802.1CB/D2.4, Jun. 2016, Institute of Electrical and Electronics Engineers, Inc., 109 pages.

Time-Sensitive Networking Task Group, "Draft Standard for Local and metropolitan area networks—Frame Replication and Elimination for Reliability," IEEE P802.1CB/D2.8, Mar. 2017, 97 pages.

International Search Report and Written Opinion for International Patent Application No. PCT/EP2021/056309, mailed Jun. 29, 2021, 10 pages.

Huawei, et al., "S2-1812087: update to Solution#3 and Solution#4," 3GPP SA WG2 Meeting #129Bis, Nov. 26-30, 2018, West Palm Beach, Florida, 13 pages.

Nasrallah, et al., "Ultra-Low Latency (ULL) Networks: The IEEE TSN and IETF DetNet Standards and Related 5G ULL Research," IEEE Communications Surveys & Tutorials, vol. 21, Issue 1, Mar. 2018, pp. 88-145.

Varga, et al., "802.1CB Improvements FRER Improvements of Replication and Elimination Functions," vol. 802, Issue 01, Jul. 15, 2019, Ericsson Research, 13 pages.

International Search Report and Written Opinion for International Patent Application No. PCT/EP2021/056306, mailed Jun. 22, 2021, 12 pages.

Notice of Reasons for Refusal for Japanese Patent Application No. 2022-554823, mailed Jan. 9, 2024, 7 pages.

Notice of Reasons for Refusal for Japanese Patent Application No. 2022-554823, mailed Jun. 18, 2024, 4 pages.

* cited by examiner

ETHERNET HEADER

*R-TAG format (Figure 7-4 in IEEE 802.1CB)*

*Elimination process considering the "SeqResetFlag"*

*Elimination process reset based on indirect (event based) notification*

PACKET OR FRAME REPLICATION AND ELIMINATION WITH EXPLICT OR IMPLICIT NOTIFICATION TO RESET SEQUENCE NUMBER RECOVERY

This application is a 35 U.S.C. § 371 national phase filing of International Application No. PCT/IB2019/055763, filed Jul. 5, 2019, the disclosure of which is incorporated herein by reference in its entirety.

TECHNICAL FIELD

The present disclosure relates to packet or frame replication and elimination in a Time Sensitive Networking (TSN) network or Deterministic Networking (DetNet) network.

BACKGROUND

Time Sensitive Networking (TSN) is currently being developed at the Institute of Electrical and Electronics Engineers (IEEE) as a new technology that enhances IEEE 802.1 and IEEE 802.3 Ethernet standards to an entirely new level of determinism. TSN can be seen as an evolution of Ethernet to guarantee low end-to-end latency, low jitter, and low packet loss.

The TSN Task Group (TG) within the IEEE 802.1 Working Group (WG) deals with deterministic services through IEEE 802 networks. The TSN TG specifies the tools of the TSN toolbox, as well as the use of the tools for a particular purpose. The TSN TG is chartered to provide deterministic services through IEEE 802 networks with:
  guaranteed packet transport,
  low packet loss,
  bounded low latency, and
  low packet delay variation.

In order to achieve extremely low packet loss, the TSN TG specified Frame Replication and Elimination for Reliability (FRER) (see IEEE 802.1CB). FRER is targeted to avoid frame loss due to equipment failure. FRER is practically a per-frame 1+1 (or 1+n) redundancy function. There is no failure detection or switchover incorporated into FRER. In FRER, a replication point sends frames of a particular stream on two (or more) maximally disjoint paths. An elimination point then combines the resulting replicated streams (sometimes referred to herein as "member streams") received over at least some (but potentially all) of the disjoint paths and deletes an extra frames.

Note that the same functions are defined for Deterministic Networking (DetNet) networks as Packet Replication and Elimination Functions (PREFs) in order to simplify implementation and allow use of the same concept in both Layer2 (TSN) and Layer3 (DetNet) networks. The discussion herein focuses on FRER but is equally applicable to PREF.

IEEE 802.1CB states that:

[T]his standard defines Frame Replication and Elimination for Reliability (FRER), which divides a Stream into one or more linked Member Streams, thus making the original Stream a Compound Stream. It replicates the packets of the Stream, splitting the copies into the multiple Member Streams, and then rejoins those Member Streams at one or more other points, eliminates the replicates, and delivers the reconstituted Stream from those points.

FRER uses a replication function and an elimination function. The replication function may, for example, be implemented in a first TSN bridge in a communication path through the TSN network from a first TSN endpoint (referred to as a "Talker") to a second TSN endpoint (referred to as a "Listener"). The elimination function may, for example, be implemented in a last TSN bridge in the communication path (i.e., the TSN bridge closest to the second TSN endpoint). The replication function receives a Stream from the first TSN endpoint and replicates the packets in the Stream to provide multiple Member Streams (each being a copy of Stream). The Member Streams are transmitted through the TSN network via disjoint paths. At the elimination function, depending on conditions within the TSN network, one or more of the Member Streams are received (potentially all of the Member Streams are received if none of the paths have failed). The elimination function processes the received packets to discard duplicate packets.

More specifically, for each received packet received for each of the Member Streams, the elimination function evaluates the "sequence_number" sub-parameter of the packet passed up from the lower layers in order to discard duplicated packets. For this purpose, a "SequenceHistory" variable maintains a history of the "sequence_number" sub-parameters of recently received packets. In addition, a history window is defined by a "frerSeqRcvyHistoryLength" parameter. The "sequence_number" of the received packet is first compared to the history window (e.g., a history window where a central point of the history window corresponds to a last received "sequence_number" and a length of the window corresponds to "frerSeqRcvyHistoryLength"). If the "sequence_number" of the received packet is outside of the history window, the packet is discarded. Otherwise, if the "sequence_number" of the packet is within the history window, the elimination function checks to see if the "sequence_number" is already included in the "SequenceHistory". If so, the received packet is determined to be a duplicate packet and is therefore discarded. Otherwise, the received packet is determined to be a new packet. Therefore, the "sequence_number" of the packet is added to the "SequenceHistory", the history window is updated based on the "sequence_number" of the packet, and the packet is passed to the second TSN endpoint. This process continues for each packet received for any of the Member Streams.

IEEE 802.1CB also defines a timeout mechanism for the elimination function in order to cope with some networking scenarios that results in unnecessarily dropped frames (e.g., if the elimination function somehow gets out of step with its corresponding Sequence generation function; if a Sequence generation function is reset, etc.). If a timeout occurs before receiving a packet from any of the Member Streams that has a "sequence_number" that is within the history window, the "SequenceHistory" and the history window are reset, and the elimination function is allowed to accept the next packet received for any of the Member Streams, regardless of the value of its "sequence_number" sub-parameter. Once this next packet is received, its "sequence_number" is added to the "SequenceHistory" and the history window is updated accordingly.

The above described history window and timeout mechanism require good design of related parameters. However, these are not trivial tasks as contradicting requirements must be fulfilled. For instance, during the history window design, one may intend to select a small window size, for example, in order to protect the Elimination node resources or to protect against bogus packets (security). However, large window size values are more tolerant to network failures and errors. It may be a difficult task to find an optimum window size. Similarly, designing a timeout parameter value that is too small may cause frequent and unnecessary reset of the elimination function. On the other hand, a timeout parameter value that is too large slows down recovery after failure scenarios and causes unwanted networking transient. Furthermore, using FRER for bursty (non-Constant Bit Rate (CBR)) streams makes the above design more challenging or even makes it impossible to find a good balance.

As such, there is a need to provide a solution(s) that allow faster recovery in problematic scenarios in order to minimize the number of unnecessarily dropped frames.

SUMMARY

Systems and methods for packet or frame replication and elimination in a Time Sensitive Networking (TSN) network or Deterministic Networking (DetNet) network are disclosed. In some embodiments, a method of operation of a node in a TSN network or DetNet comprises determining whether to reset a sequence recovery function used for frame or packet elimination for a particular stream of packets based on either or both of an explicit indication or an implicit indication. The method further comprises resetting the sequence recovery function used for frame or packet elimination for the particular stream of packets upon determining to reset the sequence recovery function used for frame or packet elimination for the particular stream of packets. In this manner, packet or frame elimination is improved by avoiding scenarios that result in discarding valid packets or frames due to an out of sync condition between the sequence generation function at the replicator and the sequence recovery function at the eliminator due to resetting of the sequence generation function or network failures.

In some embodiments, resetting the sequence recovery function comprises resetting a sequence number history, a history window, or both the sequence number history and the history window.

In some embodiments, determining whether to reset the sequence recovery function comprises determining whether to reset the sequence recovery function based on the explicit indication. In some embodiments, the method further comprises receiving a packet of the particular stream of packets, wherein the packet comprises the explicit indication. Further, in some embodiments, the explicit indication is an explicit indication to reset the sequence recovery function, and determining whether to reset the sequence recovery function comprises determining to reset the sequence recovery function based on the explicit indication. In some embodiments, the packet comprises an Ethernet frame, and the explicit indication is comprised in a header of the Ethernet frame. Further, in some embodiments, the explicit indication is comprised in a Redundancy Tag (R-TAG) comprised in the header of the Ethernet frame. Further, in some embodiments, the explicit indication is encoded in one or more bits in a reserved field of the R-TAG. In some embodiments, the explicit indication is encoded in one or more bits in a sequence number field comprised in the R-TAG, and a plurality of remaining bits in the sequence number field indicate a sequence number of the packet in the particular stream of packets. In some embodiments, the explicit indication is one of a set of possible sequence number values for a sequence number field comprised in the R-TAG, the one of the set of possible sequence number values being a combined indication of: (a) the explicit indication and (b) a sequence number of the packet in the particular stream of packets.

In some embodiments, the method further comprises obtaining a sequence number from the packet. Further, determining whether to reset the sequence recovery function based on the explicit indication comprises determining that the sequence number is outside of a history window for the particular stream of packets and determining that the explicit indication to reset the sequence recovery function is present in the packet. A determination is made to reset the sequence recovery function upon determining that the sequence number is outside of the history window for the particular stream of packets and determining that the explicit indication to reset the sequence recovery function is present in the packet. In some embodiments, the method further comprises, after resetting the sequence recovery function, updating the sequence number history and the history window based on the sequence number obtained from the packet and passing the packet to a next node in a respective path of the TSN or DetNet network domain.

In some embodiments, the method further comprises obtaining a sequence number from the packet. Further, the explicit indication to reset the sequence recovery function is present in the packet, and determining whether to reset the sequence recovery function based on the explicit indication comprises determining that the sequence number is within a history window for the particular stream of packets. A determination is made to not reset the sequence recovery function upon determining that the sequence number is within the history window for the particular stream of packets even though the explicit indication to reset the sequence recovery function is present in the packet.

In some embodiments, the method further comprises obtaining a sequence number from the packet. Further, determining whether to reset the sequence recovery function based on the explicit indication comprises determining that the explicit indication to reset the sequence recovery function is not present in the packet. A determination is made to not reset the sequence recovery function upon determining that the sequence number is outside of the history window for the particular stream of packets and determining that the explicit indication to reset the sequence recovery function is not present in the packet.

In some embodiments, determining whether to reset the sequence recovery function comprises determining whether to reset the sequence recovery function based on the implicit indication. In some embodiments, the implicit indication comprises one or more notifications of one or more remote events. In some embodiments, the one or more remote events comprise a path failure detected via Operations and Management (OAM) Continuity Check (CC). In some embodiments, the implicit indication comprises one or more notifications of one or more local events at the node (e.g., interface up or down events).

Embodiments of a node for a TSN network or DetNet network for frame or packet replication/elimination for reliability are also disclosed. In some embodiments, the node is adapted to determine whether to reset a sequence recovery function used for frame or packet elimination for a particular stream of packets based on either or both of an explicit indication or an implicit indication. The node is further adapted to reset the sequence recovery function used for frame or packet elimination for the particular stream of packets upon determining to reset the sequence recovery function used for frame or packet elimination for the particular stream of packets.

In some embodiments, the node comprises a network interface and processing circuitry associated with the network interface. The processing circuitry is configured to cause the node to determine whether to reset the sequence recovery function used for frame or packet elimination for the particular stream of packets based on either or both of an explicit indication or an implicit indication and reset the sequence recovery function used for frame or packet elimination for the particular stream of packets upon determining to reset the sequence recovery function used for frame or packet replication for the particular stream of packets.

Embodiments of a method of operation of a node in a TSN network or DetNet network for frame or packet replication for reliability are also disclosed. In some embodiments, the method comprises transmitting a packet of a particular stream of packets via a first network path, and transmitting the packet of the particular stream of packets via a second network path. The packet comprises an explicit indication that a sequence recovery function used for frame or packet elimination for the particular stream of packets is to be reset.

In some embodiments, the packet comprises an Ethernet frame, and the explicit indication is comprised in a header of the Ethernet frame. Further, in some embodiments, the explicit indication is comprised in a R-TAG comprised in the header of the Ethernet frame. Further, in some embodiments, the explicit indication is encoded in one or more bits in a reserved field of the R-TAG. In some other embodiments, the explicit indication is encoded in one or more bits in a sequence number field comprised in the R-TAG, and a plurality of remaining bits in the sequence number field indicate a sequence number of the packet in the particular stream of packets. In some other embodiments, the explicit indication is one of a set of possible sequence number values for a sequence number field comprised in the R-TAG, the one of the set of possible sequence number values being a combined indication of: (a) the explicit indication and (b) a sequence number of the packet in the particular stream of packets.

Embodiments of a node for a TSN network or DetNet network for frame or packet replication for reliability are also disclosed. In some embodiments, the node is adapted to transmit a packet of a particular stream of packets via a first network path, and transmit the packet of the particular stream of packets via a second network path. The packet comprises an explicit indication that a sequence recovery function used for frame or packet elimination for the particular stream of packets is to be reset.

In some embodiments, the node comprises a network interface and processing circuitry associated with the network interface. The processing circuitry is configured to cause the node to transmit the packet of a particular stream of packets via the first network path and transmit the packet of the particular stream of packets via the second network path. The packet comprises the explicit indication that the sequence recovery function used for frame or packet elimination for the particular stream of packets is to be reset.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
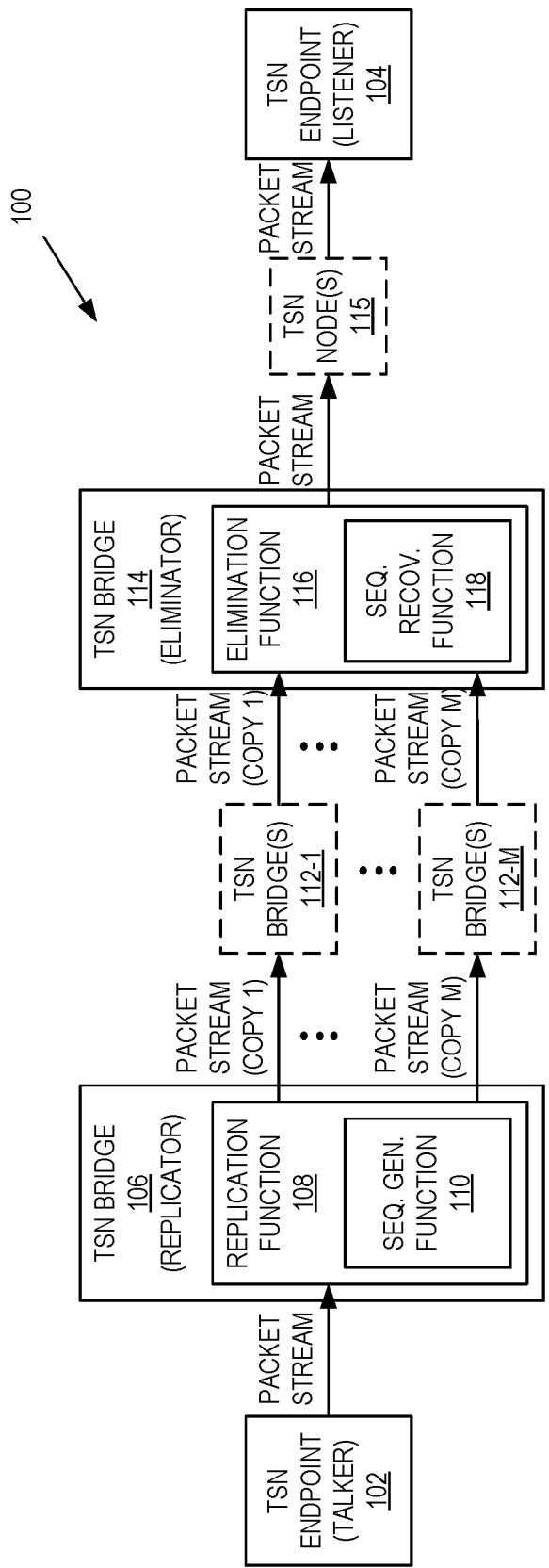
FIG. 1 illustrates one example of a Time Sensitive Networking (TSN) network in which embodiments of the present disclosure may be implemented.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

TSN Node: As used herein, a Time Sensitive Networking (TSN) node is any network node in a TSN network. Examples of a TSN node include a TSN endpoint and a TSN bridge.

Systems and methods are disclosed herein for improving the elimination function in a TSN network using Frame Replication and Elimination for Reliability (FRER) in accordance with Institute of Electrical and Electronics Engineers (IEEE) 802.1CB (or likewise in a Deterministic Networking (DetNet) network using Packet Replication and Elimination Functions (PREFs). Note that the discussion herein uses IEEE 802.1CB terminology and variable names where appropriate, denoted as "VariableName". New variables, functions, and parameters follow IEEE 802.1CB naming conventions and are denoted as "NewEntityName".

More specifically, embodiments are disclosed herein that provide a solution(s) to the following problem scenarios, where frames are dropped unnecessarily:
 (i) replication function reset which results in a reset or restarting of the sequence number at the replication function, and
 (ii) network failures causing valid packets to be treated as being out of the history window.

In problem scenario (i), when the replication function resets and the sequence number is reset to zero, packets thereafter received by the elimination function will have sequence numbers that are likely to be outside of the history window. As a result, these packets will be dropped even though they are valid. In problem scenario (ii), if the network failures persist long enough, the history window maintained at the elimination function will become out of sync with the sequence numbers of valid packets being transmitted by the replication function. As a result, when the network failures end, the packets received at the elimination function will have sequence numbers that are outside of the history window and will therefore be dropped. Embodiments of the present disclosure address these two problem scenarios.

As described herein, the elimination function uses one or more new triggers for resetting a sequence recovery function (i.e., resetting the history window and/or the sequence number history at the elimination function). As described below, the one or more new triggers include:

an explicit indication (also referred to herein as an explicit notification) to reset the sequence recovery function, and/or an implicit indication (also referred to herein as an implicit notification or indirect notification) to reset the sequence recovery function.

In some embodiments, the explicit indication is included in the packet received by the elimination function. More specifically, in some embodiments, the packet includes an Ethernet frame, and the explicit indication is included in a header of the Ethernet frame. In some preferred embodiments, the explicit indication is included in a Redundancy Tag (R-TAG) included in the header of the Ethernet frame. In this regard, the explicit indication is sometimes referred to herein as a "SeqResetFlag" that is included in the R-TAG of the header of the Ethernet frame. The explicit indication (e.g., the "SetResetFlag") is set by the replication function when the replication function was reset. In this manner, the reset of the replication function can easily be recognized by the elimination function. This solves problem scenario (i).

In some embodiments, the implicit indication is an indication or notification of a remote event(s) (e.g., path failure detected via Operations and Management (OAM) Continuity Check (CC) messages) or node-local event(s) (e.g., interface up/down) that are interpreted by the elimination function as a trigger to reset the sequence recovery function. This solves problem scenario (ii).

The embodiments described herein can ensure much faster adaptation to network failure scenarios and protect against unnecessary packet drops when using FRER (or in a TSN network (or likewise when using PREF in a DetNet network).

FIG. 1 illustrates one example of a TSN network 100 in which embodiments of the present disclosure may be implemented. Note that while the TSN network 100 is shown as an example, a similar architecture applies for a DetNet network. As illustrated, the TSN network 100 includes a first TSN endpoint 102, which is also referred to as the "Talker", that transmits a packet stream (i.e., Stream) to a second TSN endpoint 104, which is also referred to as the "Listener", via the TSN network 100. The TSN endpoints 102 and 104 may be any suitable type of devices. For example, the first TSN endpoint 102 may be a controller, and the second TSN endpoint 104 may be an industrial robotics device.

The TSN network 100 also includes a first TSN bridge 106, which is also referred to as the "Replicator". Note that while the first TSN endpoint 102 and the first TSN bridge 106 are illustrated as separate TSN nodes in this example, the first TSN endpoint 102 and the first TSN bridge 106 may alternatively be implemented as a single TSN node. The first TSN bridge 106 receives the packet stream from the first TSN endpoint 102 and replicates the packet stream to provide a number (M) of packet streams (referred to as COPY 1, . . . , COPY M or likewise Member Stream 1, . . . , Member Stream M). More specifically, the first TSN bridge 106 includes a replication function 108 that receives the packet stream from the first TSN endpoint 102. A sequence generation function 110 operates to generate sequence numbers for the packets in the packet stream. For each packet in the packet stream, the replication function 108 inserts a respective sequence number (generated by the sequence generation function 110) into the packet, replicates the resulting packet to provide M copies of the packet, and transmits the M copies of the packet to the second TSN endpoint 104 over disjoint paths through the TSN network 100. The sequence generation function 110 operates on packets passed down the protocol stack towards the physical layer and generates a value for the sequence number sub-parameter. This process is repeated for each received packet, resulting in the M copies of the packet stream that are transmitted via disjoint paths.

Each m-th copy of the packet stream (where m={1, . . . , M}) optionally traverses one or more intermediate TSN bridges 112-$m$ before arriving at a second TSN bridge 114, which operates as an elimination point (or "Eliminator") for the packet stream transmitted from the first TSN endpoint 102 to the second TSN endpoint 104. In this example, the second TSN bridge 114 is either connected directly to the second TSN endpoint 104 or connected to the second TSN endpoint 104 via one or more additional TSN nodes 115 (e.g., one or more additional TSN bridges). Also, note that while the second TSN endpoint 104 and the second TSN bridge 114 are illustrated as separate TSN nodes in this example, the second TSN endpoint 104 and the second TSN bridge 114 may alternatively be implemented as a single TSN node. As illustrated, the second TSN bridge 114 includes an elimination function 116. The elimination function 116 receives the M copies of the packet stream (assuming that none of the disjoint paths have failed) and operates to discard duplicate or invalid packets before sending a resulting packet stream to the second TSN endpoint 104. More specifically, a sequence recovery function 118 of the elimination function 116 operates on packets passed up the protocol stack towards the higher layer functions and uses the sequence number sub-parameter to decide which packets to pass and which to discard.

As described below in detail, in some embodiments, when the replication function 108 is reset (and more specifically when the sequence generation function 110 is reset), the replication function 108 includes an explicit indictor (e.g., the "SeqResetFlag") in the M copies of a respective packet that indicates to the elimination function 116 that a sequence recovery function 118 of the elimination function 116 is to be reset (i.e., the sequence history maintained for the packet stream and/or the history window maintained for the packet stream is/are to be reset). Upon receiving this explicit indicator, the sequence recovery function 118 is reset, thereby preventing valid packets from being discarded due to the reset of the sequence generation function 110.

As also described below in detail, in some embodiments, the elimination function 116 obtains an implication indication to reset the sequence recovery function 118 (e.g., upon network failure(s)). Upon obtaining the implication indication, the sequence recovery function 118 is reset such that valid packets are not discarded due to an out of sync condition between the history window maintained by the elimination function 116 for the packet stream and the sequence numbers of receive packets.

Figure 2:
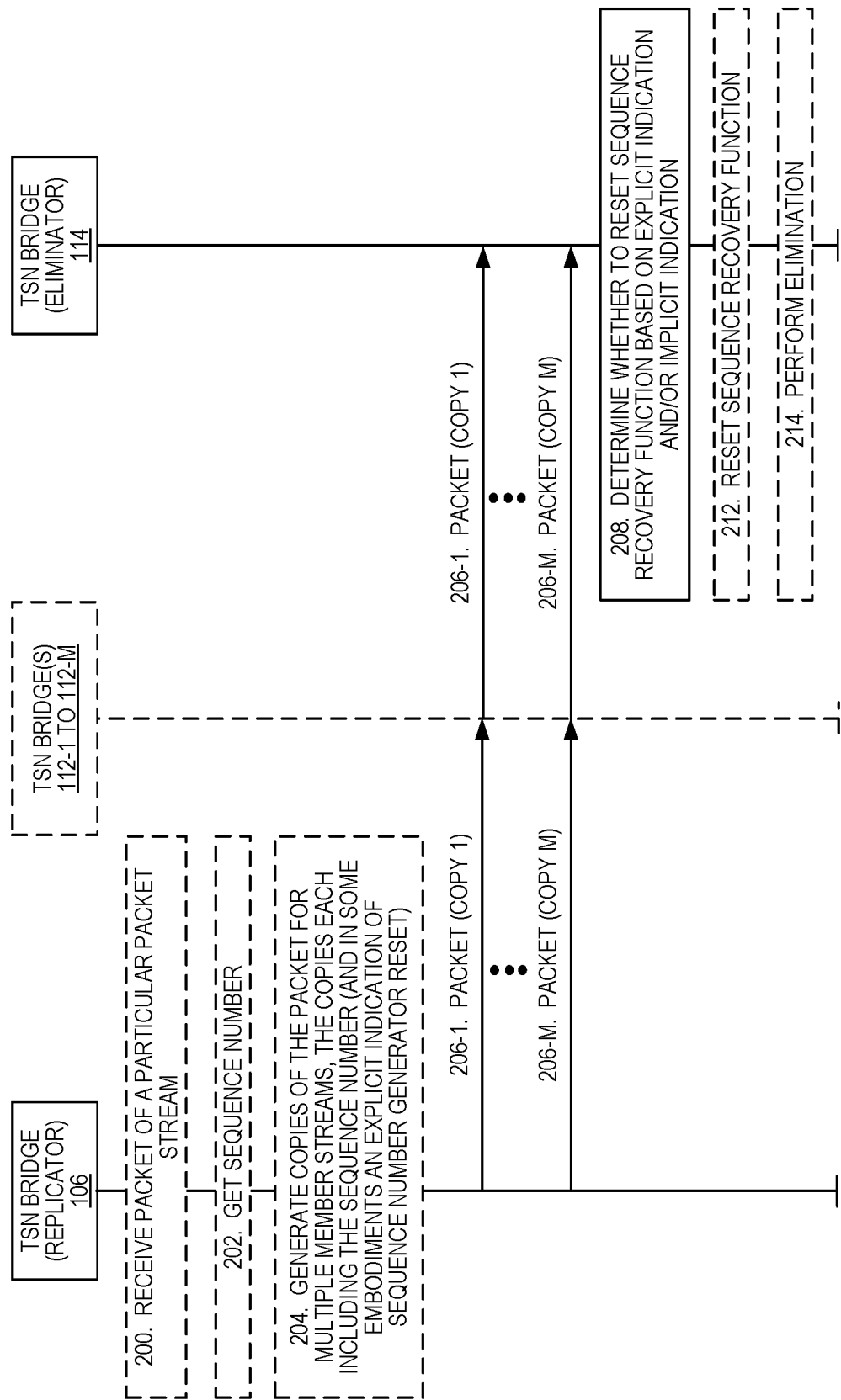
FIG. 2 illustrates the operation of a first TSN bridge and a second TSN bridge in accordance with some embodiments of the present disclosure.

FIG. 2 illustrates the operation of the first TSN bridge 106 and the second TSN bridge 114 in accordance with some embodiments of the present disclosure. Note that optional steps are represented with dashed lines. As illustrated, the first TSN bridge 106 receives a packet of a particular packet stream (e.g., from the first TSN endpoint 102) (step 200). At the first TSN bridge 106, the sequence generation function 110 gets, or generates, a sequence number for the packet (step 202) and the replication function 108 generates the M copies of the packet, each including the sequence number of the packet (step 204). In some embodiments, if the replication function 108, or more specifically the sequence generation function 110, has been reset, an explicit indicator of this reset is also included in each of the M copies of the packet. The first TSN bridge 106 transmits the M copies of the packet via disjoint paths through the TSN network 100 (steps 206-1 through 206-M).

At the second TSN bridge 114, the elimination function 116 determines whether to reset the sequence recovery function 118 based on an explicit indication included in the packet that indicates whether the sequence generation function 110 has been reset, an implicit indication, or both (step 208). If the determination is made to reset the sequence recovery function 118, the sequence recovery function 118 is reset (step 212). The elimination function 116 then performs the elimination process for the packet (step 214).

Explicit Notification

In some embodiments, an explicit indication to reset the sequence recovery function 118 is included in the packet received by the elimination function 116. More specifically, in some embodiments, the packet includes an Ethernet frame, and the explicit indication is included in a header of the Ethernet frame. In some preferred embodiments, the explicit indication is included in the R-TAG included in the header of the Ethernet frame. In this regard, the explicit indication is sometimes referred to herein as a "SeqResetFlag" that is included in the R-TAG of the header of the Ethernet frame. The explicit indication (e.g., the "SetResetFlag") is set by the replication function 108 when the replication function 108 was reset. In this manner, the reset of the replication function 108 can easily be recognized by the elimination function 116. This solves problem scenario (i).

Using the "SeqResetFlag" that is included in the R-TAG of the header of the Ethernet frame as an example, upon receiving a packet for a particular packet stream, the replication function 108 operates as follows:

The replication function 108 does not change the "SeqResetFlag" value of the packet if R-TAG already exists in the packet. In other words, replication is only performed if the first TSN bridge 106 is the first replication point traversed by the packet. If R-TAG already exists in the packet, this means that the replication function 108 is not the first replication point traversed by the stream of packets. In other words, the packet stream has already been replicated. As such, the packet stream is not replicated again. In this case, the replication function 108 does not change the "SeqResetFlag" value of the packet.

Otherwise, if R-TAG does not already exists in the packet (i.e., if the first TSN bridge 106 is the first replication point traversed by the packet):

If the sequence generation function 110 was reset, the replication function 108 sets the "SeqResetFlag" (e.g., sets the "SeqResetFlag" to a value of 1). Note that the replication function 108 may set the "SeqResetFlag" only for the first packet after the reset occurred or may set the "SeqResetFlag" in all packets for a given time period or in a given number of packets.

If the sequence generation function 110 was not reset (or if it was reset but the given time period has expired or the "SeqResetFlag" has already been set in the given number of packets), the replication function 108 unsets the "SeqResetFlag" (e.g., sets the "SeqResetFlag" to a value of 0) to thereby indicate that the sequence recovery function 118 is not to be reset.

Upon receiving a packet for one of the copies of the particular packet stream, the elimination function 116 operates as follows:

The elimination function 116 determines whether the sequence number of the packet is outside of the history window for the particular packet stream.

If the sequence number of the packet is outside of the history window and the "SeqResetFlag" is set, the elimination function 116 resets the sequence recovery function 118 (e.g., resets both the history window and the sequence number history), updates the history window and the sequence number history based on the sequence number of the packet (e.g., sets "RecovSeqNum" to the "sequence_number" of the packet and adds the "sequence_number" of the packet to the sequence number history), and passes the packet to the second TSN endpoint 104.

If the sequence number of the packet is outside of the history window and the "SeqResetFlag" is unset, the elimination function 116 discards the packet because the packet is invalid.

If the sequence number of the packet is within the history window, the "SeqResetFlag" is ignored and the packet is passed to the second TSN endpoint 104. In other words, if the sequence number of the packet is within the history window, the sequence recovery function 118 is not reset even if the "SeqResetFlag" is set.

Note that the elimination function 116 does not change the "SeqResetFlag" value of the packet.

Figure 3:
FIG. 3 illustrates an example of the header of an Ethernet frame that includes a Redundancy Tag (R-TAG)
Figure 4:
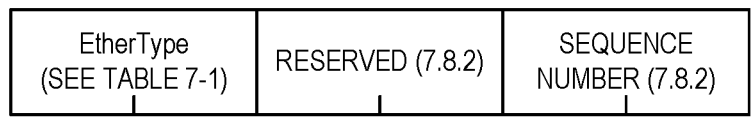
FIG. 4 illustrates the R-TAG format.

As discussed above, in some embodiments, the explicit indication is the "SeqResetFlag" where the "SeqResetFlag" is included in the R-TAG of the header of the Ethernet frame included in the packet. FIG. 3 illustrates an example of the header of an Ethernet frame that includes the R-TAG, and FIG. 4 illustrates the R-TAG format. While the "SeqResetFlag" may be included in the R-TAG in any desired manner, some examples are as follows. As a first example, the "SeqResetFlag" is included in (e.g., encoded in) the reserved field of the R-TAG (second and/or third bytes of the R-TAG). As per the current IEEE 802.1CB standard: "This field shall be transmitted with all zeros and shall be ignored on receipt."

As a second example, the "SeqResetFlag" is encoded in the R-TAG using one bit of the Sequence Number field of the R-TAG. For instance, "GenSeqSpace" and "RecovSeqSpace" variables may be used to limit the range of values used in the "Sequence Number" field. Setting their values to 32768 (or lower) means that only 15 bits of the "Sequence Number" field are needed to encode the "sequence_number" sub-parameter. The remaining 1 bit can be used as a "SeqResetFlag".

As a third example, the "SeqResetFlag" is encoded in the R-TAG using special value(s) of the Sequence Number field in the R-TAG. For instance, "GenSeqSpace" and "RecovSeqSpace" variables may be used to limit the range of valid "sequence_number" values. "Sequence Number" field values out of the range can be used as special meaning values, like indicating a set "SeqResetFlag". This solution requires modification of the sequence generation and sequence recovery function. For example, setting "GenSeqSpace" and "RecovSeqSpace" to 65504 means that 32 values of the "Sequence Number" field can be used as special values (range: 65504-65535). As an example, a "Sequence Number" value of 65535 can mean for the sequence recovery function that "SeqResetFlag" is set and the "sequence_number" sub-parameter of the packet is 0.

Figure 5:
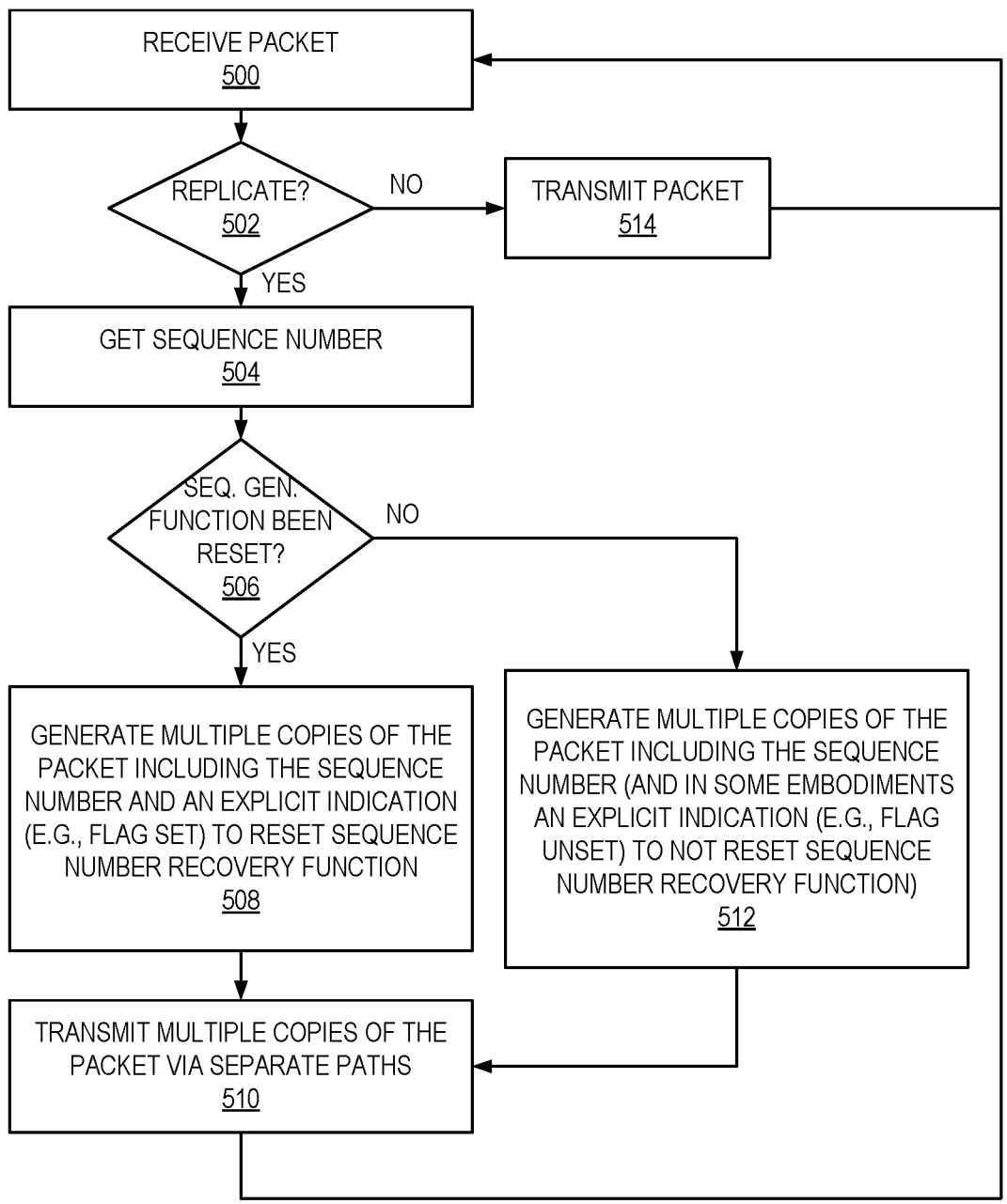
FIG. 5 is a flow chart that illustrates the operation of the TSN bridge including a replication function in accordance with some embodiments of the present disclosure.

FIG. 5 is a flow chart that illustrates the operation of the first TSN bridge 106 including the replication function 108 in accordance with some embodiments of the present disclosure. Note that this flow chart is only an example. Variations will be apparent to those of skill in the art. Further, while steps are illustrated as being performed in a particular order, the steps may be performed in a different order unless otherwise stated or required.

As illustrated, the first TSN bridge 106 receives a packet for a particular packet stream (step 500). At the first TSN bridge 106, the replication function 108 determines whether the packet is to be replicated (e.g., determines whether the packet already includes an R-TAG) (step 502). If the packet does need to be replicated (e.g., if the packet does not already include an R-TAG), the replication function 108, and more specifically the sequence generation function 110, gets (e.g., generates) a sequence number for the packet (step 504).

The replication function 108 also determines whether the sequence generation function 110 has been reset (step 506). If so, the replication function 108 generates M copies of the packet, each including the sequence number obtained for the packet and an explicit indicator (e.g., the "SeqResetFlag" set) that the sequence generation function 110 has been reset (which is also an explicit indicator that the sequence recovery function is to be reset) (step 508). The first TSN bridge 106 then transmits the M copies of the packet (step 510). Otherwise, if the sequence generation function 110 has not been reset (step 506, NO), the replication function 108 generates M copies of the packet, each including the sequence number obtained for the packet and, optionally, the explicator indicator (e.g., the "SeqResetFlag" unset) that the sequence generation function 110 has not been reset (step 512). The first TSN bridge 106 then transmits the M copies of the packet (step 510).

Figure 6:
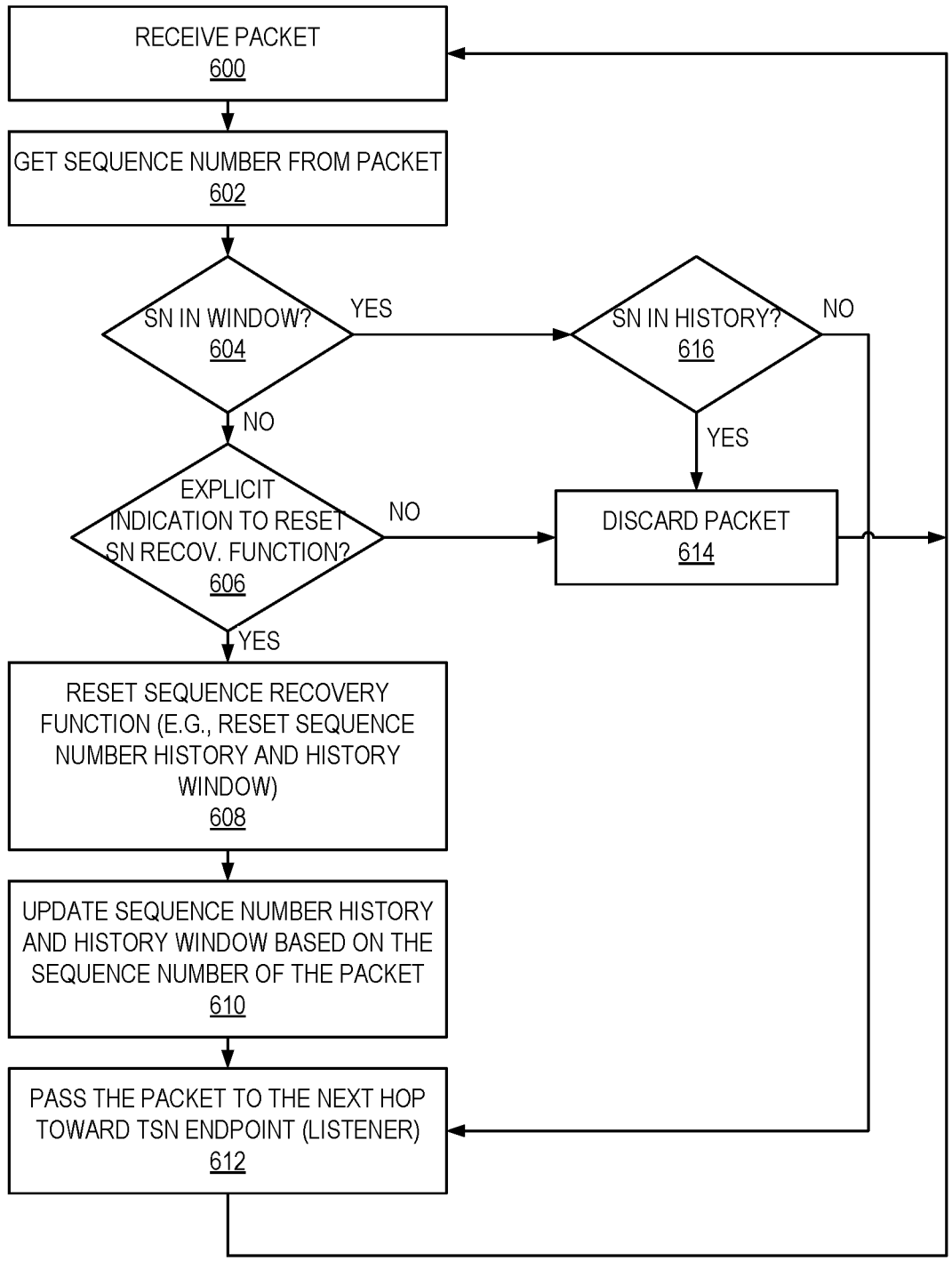
FIG. 6 is a flow chart that illustrates the operation of the TSN bridge including an elimination function in accordance with some embodiments of the present disclosure.

FIG. 6 is a flow chart that illustrates the operation of the second TSN bridge 114 including the elimination function 116 in accordance with some embodiments of the present disclosure. Note that this flow chart is only an example. Variations will be apparent to those of skill in the art. Further, while steps are illustrated as being performed in a particular order, the steps may be performed in a different order unless otherwise stated or required.

As illustrated, the second TSN bridge 114 receives a packet for a particular copy of particular packet stream (step 600) and obtains the sequence number of the packet (step 602). The elimination function 116 determines whether the sequence number of the packet is within the history window maintained by the sequence recovery function 118 for the particular stream (step 604). If not, the elimination function 116 determines whether the packet includes an explicit indication that indicates that the sequence generation function 110 has been reset (which can be interpreted as an explicit indication to reset the sequence recovery function 118) (step 606). If so, the elimination function 116 resets the sequence recovery function 118 (e.g., resets the sequence number history and the history window) (step 608) and updates the sequence number history and the history window based on the sequence number of the packet (step 610). More specifically, the sequence number history, after reset, is updated to include the sequence number of the packet. Similarly, the history window is updated such that it includes the sequence number of the packet (e.g., a center point of the history window is updated to be the sequence number of the packet). The elimination function 116 also passes the packet to the next hop in the TSN network 100 toward the second TSN endpoint 104 (step 612).

Returning to step 606, if the packet does not include an explicit indication to reset the sequence recovery function 118 (e.g., the "SeqResetFlag" is unset), the packet is discarded (step 614).

Returning to step 604, if the sequence number of the packet is within the history window, the elimination function 116 determines whether the sequence number of the packet is included in the sequence number history (i.e., whether it has already been received) (step 616). If so, the packet is discarded (step 614). Otherwise, the packet is passed to the second TSN endpoint 104 (step 612). Note that, if the sequence number of the packet is within the history window, the sequence recovery function 118 is not reset even if the packet includes the explicit indication of the reset of the sequence generation function 110.

Figure 7:
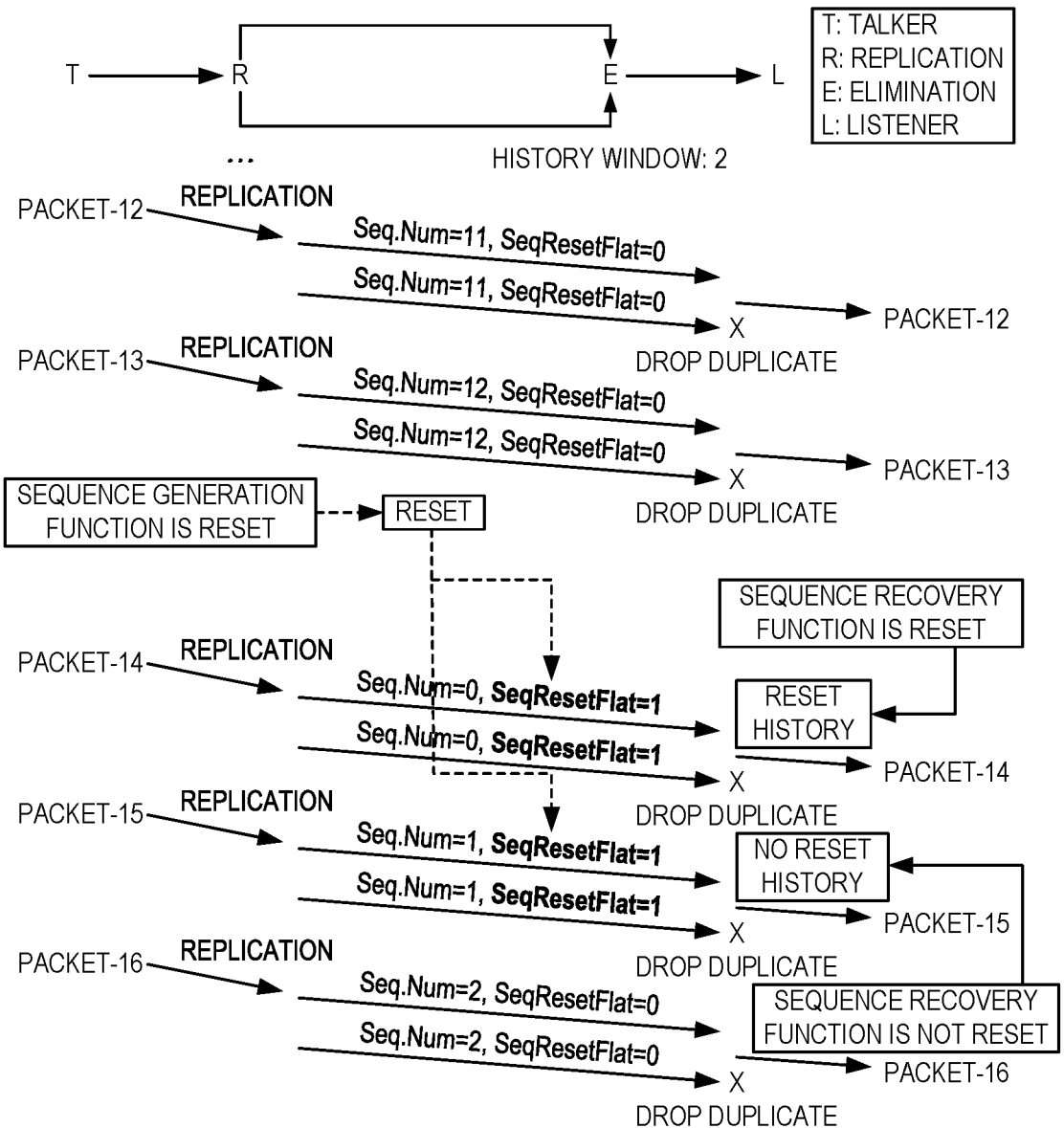
FIG. 7 is a packet sequence diagram for an example scenario illustrating aspects of the processes of FIGS. 5 and 6.

FIG. 7 is a packet sequence diagram for an example scenario. In this example, after reset of the sequence generation function 118, the replication node (i.e., the first TSN bridge 106 in the example of FIG. 1) sends two packets with "SeqResetFlag" set. The first packet (packet-14) resets the sequence recovery function 118 at the elimination node (e.g., the second TSN bridge 114 in the example of FIG. 1), and the first packet (packet-14) is accepted at the elimination node despite being out of the history window. The second packet (packet-15) is within the new history window and is therefore accepted.

Implicit Indication

In some embodiments, an implicit indication triggers reset of the sequence recovery function 118. In some embodiments, the implicit indication is an indication or notification of a remote event(s) (e.g., path failure detected via OAM CC messages) or node-local event(s) (e.g., interface up/down) that are interpreted by the elimination function 116 as a trigger to reset the sequence recovery function 118. This solves problem scenario (ii).

The specific event (or combination of events) that are interpreted as the implicit indication depend on the specific network scenario. For example, if all Member Streams are affected by a temporary network failure, then due to the loss of packets, the received packets after the failure may contain "sequence_number" values that are out of the history window. Therefore, such packets are unnecessarily dropped. Network events like CC failures can provide a hint for such scenarios and the elimination node may decide to trigger the "SequenceRecoveryReset" function. Examples of relevant temporary network failure scenarios are link failures, link flapping, convergence, etc.

Figure 8:
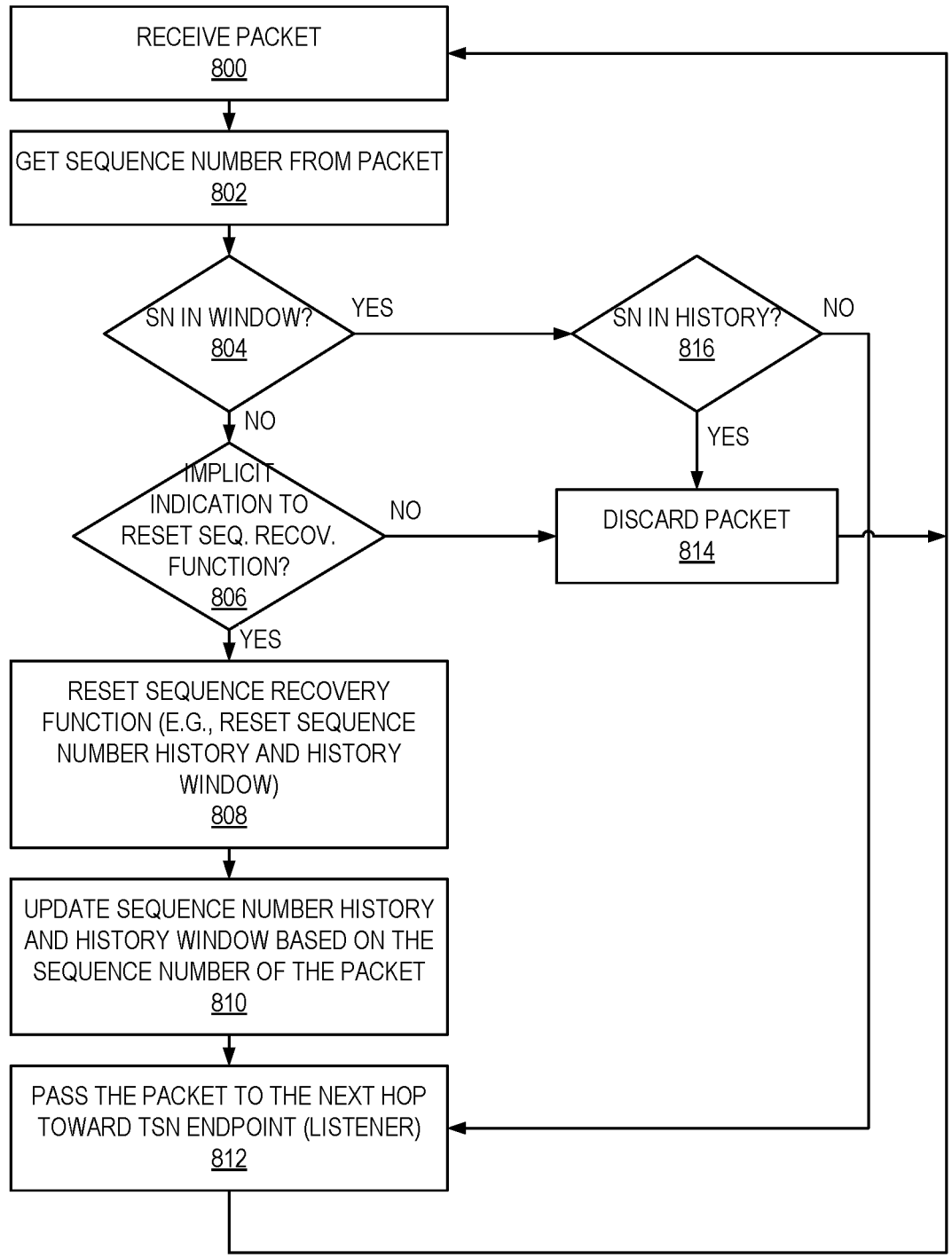
FIG. 8 is a flow chart that illustrates the operation of the TSN bridge including an elimination function in accordance with some other embodiments of the present disclosure.

FIG. 8 is a flow chart that illustrates the operation of the second TSN bridge 114 in accordance with some embodiments of the present disclosure. Note that this flow chart is only an example. Variations will be apparent to those of skill in the art. Further, while steps are illustrated as being performed in a particular order, the steps may be performed in a different order unless otherwise stated or required.

As illustrated, the second TSN bridge 114 receives a packet for a particular copy of particular packet stream (step 800) and obtains the sequence number of the packet (step 802). The elimination function 116 determines whether the sequence number of the packet is within the history window maintained by the sequence recovery function 118 for the particular stream (step 804). If not, the elimination function 116 determines whether there is an implicit indication to reset the sequence recovery function 118 (step 806). If so, the elimination function 116 resets the sequence recovery function 118 (e.g., resets the sequence number history and the history window) (step 808) and updates the sequence number history and the history window based on the sequence number of the packet (step 810). More specifically, the sequence number history, after reset, is updated to include the sequence number of the packet. Similarly, the history window is updated such that it includes the sequence number of the packet (e.g., a center point of the history window is updated to be the sequence number of the packet). The elimination function 116 also passes the packet to the next hop in the TSN network 100 toward the second TSN endpoint 104 (step 812).

Returning to step 806, if there is no implicit indication to reset the sequence recovery function 118, the packet is discarded (step 814).

Returning to step 804, if the sequence number of the packet is within the history window, the elimination function 116 determines whether the sequence number of the packet is included in the sequence number history (i.e., whether it has already been received) (step 816). If so, the packet is discarded (step 814). Otherwise, the packet is passed to the second TSN endpoint 104 (step 812). Note that, if the sequence number of the packet is within the history window, the sequence recovery function 118 is not reset even if there is an implicit indication to reset the sequence recovery function 118.

Figure 9:
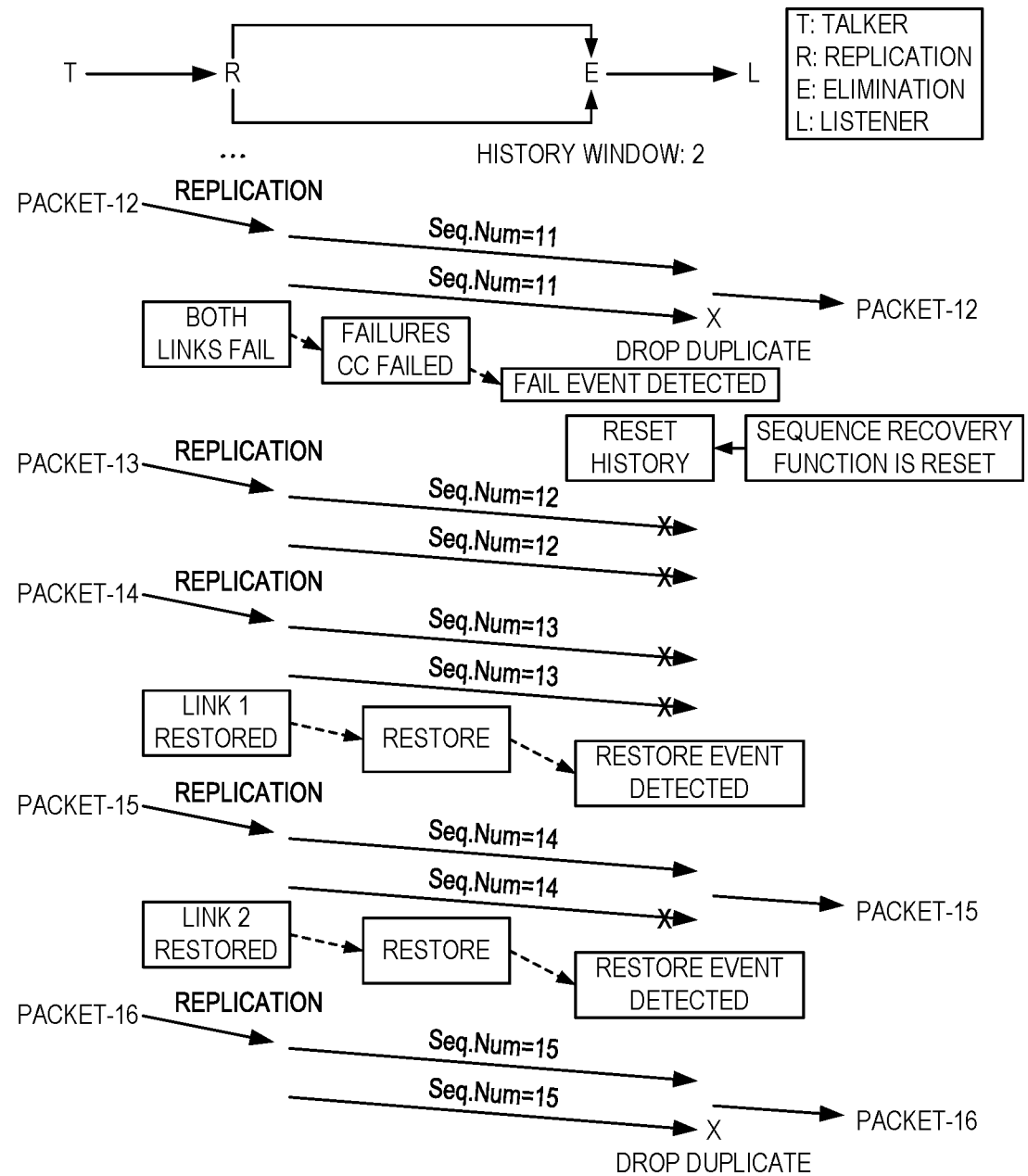
FIG. 9 is a packet sequence diagram for an example scenario illustrating aspects of the process of FIG. 8.

FIG. 9 is packet sequence diagram for an example scenario. In this example, after sending packet-12, there is a network failure for both paths. Some remote event(s) or local event(s) related to the network failures of the paths are interpreted by the elimination node (e.g., the second TSN bridge 114 in the example of FIG. 1) as an implicit indication to reset the sequence recovery function 118. As such, the sequence number history and the history window are reset. Due to the network failures, packet-13 and packet-14 are dropped. The path (link-1) for the Member Stream is restored such that packet-15 is received by the elimination node. Since the sequence recovery function 118 has been reset, packet-15 is not discarded by the elimination function 116, and the sequence number of packet-15 is added to the sequence number history and used to update the history window. Thereafter, link-2 is restored, and the process continues as described above.

Figure 10:
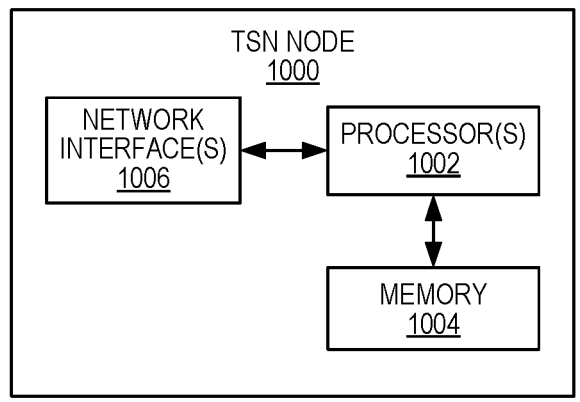
FIG. 10 is a schematic block diagram of a TSN node according to some embodiments of the present disclosure.

FIG. 10 is a schematic block diagram of a TSN node 1000 according to some embodiments of the present disclosure. The TSN node 1000 may be, for example, a TSN endpoint (e.g., TSN endpoint 102 or 104), a TSN bridge (e.g., TSN bridge 106 or 114), or a combined TSN endpoint and TSN bridge. As illustrated, the TSN node 1000 includes one or more processors 1002 (e.g., Central Processing Units (CPUs), Application Specific Integrated Circuits (ASICs), Field Programmable Gate Arrays (FPGAs), and/or the like), memory 1004, and one or more network interfaces 1006. The one or more processors 1002 are also referred to herein as processing circuitry. The one or more processors 1004 operate to control the TSN node 1000 to provide one or more functions of a TSN endpoint (e.g., TSN endpoint 102 or 104), a TSN bridge (e.g., TSN bridge 106 or 114), or a combined TSN endpoint and TSN bridge, as described herein. In some embodiments, the function(s) are implemented in software that is stored, e.g., in the memory 1004 and executed by the one or more processors 1002.

Figure 11:
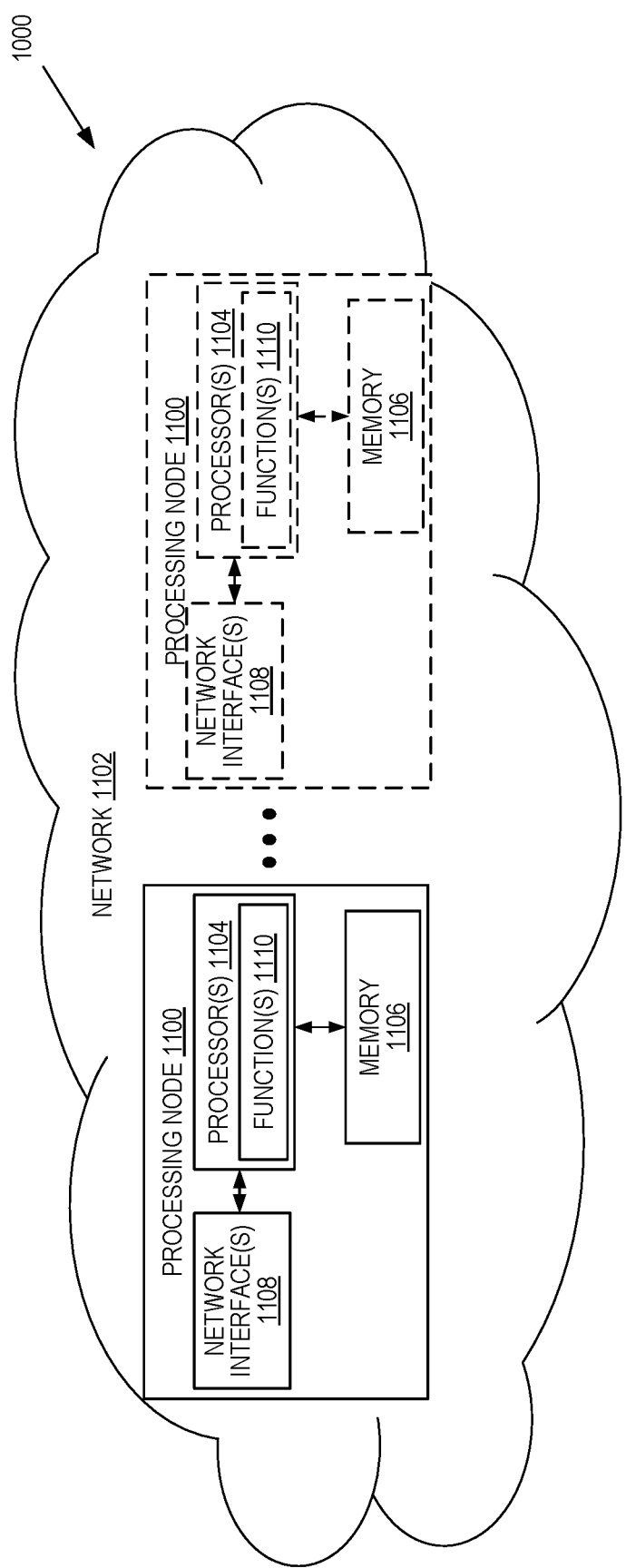
FIG. 11 is a schematic block diagram that illustrates a virtualized embodiment of the TSN node of FIG. 10 according to some embodiments of the present disclosure.

FIG. 11 is a schematic block diagram that illustrates a virtualized embodiment of the TSN node 1000 according to some embodiments of the present disclosure. As used herein, a "virtualized" TSN node is an implementation of the TSN node 1000 in which at least a portion of the functionality of the TSN node 1000 is implemented as a virtual component(s) (e.g., via a virtual machine(s)) executing on a physical processing node(s) 1100 in a network(s) 1102. As illustrated, in this example, each processing node 1100 includes one or more processors 1104 (e.g., CPUs, ASICs, FPGAs, and/or the like), memory 1106, and one or more network interfaces 1108.

In this example, functions 1110 of the TSN node 1000 described herein (e.g., one or more functions of a TSN endpoint (e.g., TSN endpoint 102 or 104), a TSN bridge (e.g., TSN bridge 106 or 114), or a combined TSN endpoint and TSN bridge) are implemented at one of the processing nodes 1100 or distributed across two or more of the processing nodes 1100 in any desired manner. In some particular embodiments, some or all of the functions 1110 of the TSN node 1000 described herein (e.g., one or more functions of a TSN endpoint (e.g., TSN endpoint 102 or 104), a TSN bridge (e.g., TSN bridge 106 or 114), or a combined TSN endpoint and TSN bridge) are implemented as virtual components executed by one or more virtual machines implemented in a virtual environment(s) hosted by the processing node(s) 1100.

In some embodiments, a computer program including instructions which, when executed by at least one processor, causes the at least one processor to carry out the functionality of TSN node 1000 or a node (e.g., a processing node 1100) implementing one or more of the functions 1110 of the TSN node 1000 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
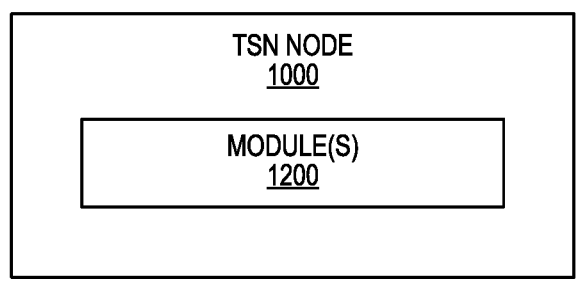
FIG. 12 is a schematic block diagram of the TSN node of FIG. 10 according to some other embodiments of the present disclosure.

FIG. 12 is a schematic block diagram of the TSN node 1000 according to some other embodiments of the present disclosure. The TSN node 1000 includes one or more modules 1200, each of which is implemented in software. The module(s) 1200 provide the functionality of the TSN node 1000 described herein (e.g., one or more functions of a TSN endpoint (e.g., TSN endpoint 102 or 104), a TSN bridge (e.g., TSN bridge 106 or 114), or a combined TSN endpoint and TSN bridge, as described herein). This discussion is equally applicable to the processing node 1100 of FIG. 11 where the modules 1200 may be implemented at one of the processing nodes 1100 or distributed across multiple processing nodes 1100.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

ASIC Application Specific Integrated Circuit
CBR Constant Bit Rate
CC Continuity Check
CPU Central Processing Unit
DetNet Deterministic Networking
DSP Digital Signal Processor
FPGA Field Programmable Gate Array
FRER Frame Replication and Elimination for Reliability
IEEE Institute of Electrical and Electronics Engineers
OAM Operations and Management
PREF Packet Replication and Elimination Function
PRER Packet Replication and Elimination for Redundancy
RAM Random Access Memory
ROM Read Only Memory
R-TAG Redundancy Tag
TG Task Group
TSN Time Sensitive Networking
WG Working Group Those skilled in the art will recognize improvements and modifications to the embodiments of the present disclosure. All such improvements and modifications are considered within the scope of the concepts disclosed herein.

What is claimed is:

1. A method of operation of a node in a Time Sensitive Networking, TSN, network or a Deterministic Networking, DetNet, network for frame or packet replication/elimination for reliability, comprising:
   receiving a packet of a particular stream of packets, wherein the packet comprises an Ethernet frame;
   determining whether to reset a sequence recovery function used for frame or packet elimination for the particular stream of packets based on an explicit indication comprised in a Redundancy Tag, R-TAG, comprised in the header of the Ethernet frame; and
   resetting the sequence recovery function used for frame or packet elimination for the particular stream of packets upon determining to reset the sequence recovery function used for frame or packet elimination for the particular stream of packets.

2. The method of claim 1 wherein resetting the sequence recovery function comprises resetting a sequence number history, a history window, or both the sequence number history and the history window.

3. The method of claim 1 wherein determining whether to reset the sequence recovery function comprises determining whether to reset the sequence recovery function based on the explicit indication.

4. The method of claim 1 wherein the explicit indication is an explicit indication to reset the sequence recovery function, and determining whether to reset the sequence recovery function comprises determining to reset the sequence recovery function based on the explicit indication.

5. The method of claim 1 wherein the explicit indication is encoded in one or more bits in a reserved field of the R-TAG.

6. The method of claim 1 wherein the explicit indication is encoded in one or more bits in a sequence number field comprised in the R-TAG, and a plurality of remaining bits in the sequence number field indicate a sequence number of the packet in the particular stream of packets.

7. The method of claim 1 wherein the explicit indication is one of a set of possible sequence number values for a sequence number field comprised in the R-TAG, the one of the set of possible sequence number values being a combined indication of: (a) the explicit indication and (b) a sequence number of the packet in the particular stream of packets.

8. The method of claim 1 further comprising:
   obtaining a sequence number from the packet;
   wherein determining whether to reset the sequence recovery function based on the explicit indication comprises:
      determining that the sequence number is outside of a history window for the particular stream of packets; and
      determining that the explicit indication to reset the sequence recovery function is present in the packet;
   wherein a determination is made to reset the sequence recovery function upon determining that the sequence number is outside of the history window for the particular stream of packets and determining that the explicit indication to reset the sequence recovery function is present in the packet.

9. The method of claim 8 further comprising, after resetting the sequence recovery function:
   updating the sequence number history and the history window based on the sequence number obtained from the packet; and
   passing the packet to a next node in a respective path of the TSN network or the DetNet network domain.

10. The method of claim 1 further comprising:
    obtaining a sequence number from the packet;
    wherein the explicit indication to reset the sequence recovery function is present in the packet, determining whether to reset the sequence recovery function based on the explicit indication comprises:
       determining that the sequence number is within a history window for the particular stream of packets;
       wherein a determination is made to not reset the sequence recovery function upon determining that the sequence number is within the history window for the particular stream of packets even though the explicit indication to reset the sequence recovery function is present in the packet.

11. The method of claim 1 further comprising:
    obtaining a sequence number from the packet;
    wherein determining whether to reset the sequence recovery function based on the explicit indication comprises:
       determining that the explicit indication to reset the sequence recovery function is not present in the packet;

wherein a determination is made to not reset the sequence recovery function upon determining that the sequence number is outside of the history window for the particular stream of packets and determining that the explicit indication to reset the sequence recovery function is not present in the packet.

12. The method of claim 1 wherein one or more remote events comprise a path failure detected via Operations and Management, OAM, Continuity Check, CC.

13. A node for a Time Sensitive Networking, TSN, network or a Deterministic Networking, DetNet, network for frame or packet replication/elimination for reliability, the node comprising:
a network interface; and
processing circuitry associated with the network interface, the processing circuitry configured to cause the node to:
receive a packet of a particular stream of packets, wherein the packet comprises an Ethernet frame;
determine whether to reset a sequence recovery function used for frame or packet elimination for the particular stream of packets based on an explicit indication comprised in a Redundancy Tag, R-TAG, comprised in the header of the Ethernet frame; and
reset the sequence recovery function used for frame or packet elimination for the particular stream of packets upon determining to reset the sequence recovery function used for frame or packet elimination for the particular stream of packets.

14. A non-transitory computer readable medium storing instructions executable by a processor of a node in a Time Sensitive Networking, TSN, network or a Deterministic Networking, DetNet, network to thereby cause the node to:
receive a packet of a particular stream of packets, wherein the packet comprises an Ethernet frame;
determine whether to reset a sequence recovery function used for frame or packet elimination for a particular stream of packets based on an explicit indication comprised in a Redundancy Tag, R-TAG, comprised in the header of the Ethernet frame; and
reset the sequence recovery function used for frame or packet elimination for the particular stream of packets upon determining to reset the sequence recovery function used for frame or packet elimination for the particular stream of packets.

15. A method of operation of a node in a Time Sensitive Networking, TSN, network or a Deterministic Networking, DetNet, network for frame or packet replication for reliability, comprising:
transmitting a packet of a particular stream of packets via a first network path, wherein the packet comprises an Ethernet frame; and
transmitting the packet of the particular stream of packets via a second network path;
wherein the packet comprises an explicit indication that a sequence recovery function used for frame or packet elimination for the particular stream of packets is to be reset, the explicit indication being comprised in a Redundancy Tag, R-TAG, comprised in the header of the Ethernet frame.

16. The method of claim 15 wherein the explicit indication is encoded in one or more bits in a reserved field of the R-TAG.

17. The method of claim 15 wherein the explicit indication is encoded in one or more bits in a sequence number field comprised in the R-TAG, and a plurality of remaining bits in the sequence number field indicate a sequence number of the packet in the particular stream of packets.

18. The method of claim 15 wherein the explicit indication is one of a set of possible sequence number values for a sequence number field comprised in the R-TAG, the one of the set of possible sequence number values being a combined indication of: (a) the explicit indication and (b) a sequence number of the packet in the particular stream of packets.

* * * * *